United States Patent
Feldmann

(10) Patent No.: US 6,267,109 B1
(45) Date of Patent: Jul. 31, 2001

(54) WARMING DEVICE

(76) Inventor: Susanne Feldmann, Bettackerstrasse 14, CH-8152 Glattbrugg (CH)

( * ) Notice: Subject to any disclaimer, the term of this patent is extended or adjusted under 35 U.S.C. 154(b) by 0 days.

(21) Appl. No.: 09/657,038

(22) Filed: Sep. 7, 2000

(30) Foreign Application Priority Data

Sep. 8, 1999 (CH) .................................................. 1632/99

(51) Int. Cl.⁷ .................................................. F24C 3/08
(52) U.S. Cl. .............................. 126/40; 126/38; 126/45; 126/50
(58) Field of Search .............................. 126/38, 9 R, 40, 126/50, 30, 275 R, 44, 45, 43; 248/188.6, 188.7, 167

(56) References Cited

U.S. PATENT DOCUMENTS

| | | | |
|---|---|---|---|
| 922,503 | * 5/1909 | Perelzveich | ............................ 126/38 |
| 2,853,126 | * 9/1958 | Corlet | ..................................... 126/38 |
| 2,928,386 | * 3/1960 | Keyt et al. | .............................. 126/38 |
| 5,307,798 | * 5/1994 | Overmars | ................................ 126/40 |
| 5,613,485 | * 3/1997 | Covault | ................................... 126/50 |

* cited by examiner

*Primary Examiner*—James C. Yeung
(74) *Attorney, Agent, or Firm*—Pauley Petersen Kinne & Fejer

(57) ABSTRACT

A warming device having a base plate on which is positioned a heat source. A plurality of carrier struts are pivotally mounted with respect to the base plate and are circumferentially arranged and each have a part surface. The part surfaces together form a standing surface. On the carrier struts are arranged lugs which each has an eccentric platelet and a lug pin. An actuation element, such as an annular disk, has radial slots into which the lug pins engage. By rotating the actuation element all carrier struts can be pivoted with the part surfaces to vary a size of the standing surface.

13 Claims, 2 Drawing Sheets

WARMING DEVICE

BACKGROUND OF THE INVENTION

1. Field of the Invention

This invention relates to a warming device, in particular a warming plate having a base plate onto which a heat source can be placed and on which carrier struts are attached, wherein the carrier struts support a standing surface.

2. Description of Related Art

Warming devices, often also called warming plates, have been known for many years. Apart from their functional purpose, particularly keeping food warm in a dish placed on the device, the warming devices also have a decorative value. The earliest models were pot-like formations of ceramic or porcelain in which a candle may be accommodated. Later models departed from this basic principle and construed metal versions which practically only have a base plate onto which a heat source may be placed and wherein carrier struts are arranged on the base plate which carry a standing surface at a distance from the base plate. Known heat sources include warming plate candles, gas burners, fuel-paste burners or spirit burners. Such warming devices are often also used for warming cheese fondues, meat fondues or other foods prepared at the table. Warming devices for such purpose are usually combined with gas or spirit burners rather than with candles.

The dishes in which food is warmed as well as pan-like receptacles for fondues have completely different large standing surfaces. While standing surfaces of the receptacles to be placed on the warming device vary, the known warming devices have a fixed standing surface which may not be changed in size or shape.

SUMMARY OF THE INVENTION

It is one object of this invention to provide a warming device, in particular a warming plate, having a base plate onto which a heat source may be placed and onto which carrier struts are attached to maintain a standing surface, formed so that it can be adapted to differing base surfaces of the receptacles which may be placed thereon.

This object is achieved by a warming device with the features described in this specification and in the claims.

One simple and inexpensive form of a pivotally movable mounting of carrier struts has a base plate bearing bores arranged in a circle for mounting rotatably movable carrier struts. The circular arrangement has various advantages. Such an arrangement provides a particularly good force introduction of the receptacle to be placed thereon and the heat source can be centrally arranged. This arrangement also provides a common actuation of all carrier struts with one another, as will be subsequently explained.

To change the standing surface, it is not necessary to directly engage the part surfaces because lugs are arranged on the carrier struts, which allow a pivoting movement of the carrier struts.

It is advantageous to provide an actuation element for pivoting carrier struts about their own axis.

It is advantageous to provide lugs with one lug pin distanced from the pivotal carrier strut on which the lugs are fastened. Such a lug pin provides a positive-fit connection to an actuation element for executing pivoting movement of the carrier struts. This positive-fit connection between the carrier pin and the actuation element may be accomplished by forming the actuation element as an annular disk with radial guide slots into which the lug pins engage. With the eccentric arrangement of the plug pins with respect to the carrier struts, rotation of the annular disk provides a common pivoting movement of all pivotal carrier struts. This requires the carrier struts to be circumferentially arranged about a circle. The actuation element may also be a circular disk which lies within the circularly arranged carrier struts. Also the circular disk would thus have suitable guide slots. The heat source then no longer stands directly on the base plate, but indirectly stands on the circular disk which lies on the base plate.

In one preferred embodiment, for a simple and favorable actuation it is possible to configure the actuation element, as already mentioned, as an annular disk with radial guide slots. With this arrangement, all carrier struts are arranged within a central opening of the annular disk.

The lugs which are rigidly arranged on the pivotally movable carrier struts may advantageously be configured such that on the carrier struts are arranged platelets which are parallel to the base plate and on which the annular disk acting as an actuation element lies, while the mentioned lug pins which are attached on the platelet engage into the guide slots.

For cost and space reasons, it is advantageous to form the part surfaces of the standing surface of wire. Usually, also the carrier struts are formed of wire.

Correspondingly, the carrier struts and the part surfaces may be manufactured of the same wire and connected to one another by soldering or welding technology. A particularly economical embodiment of this invention, the part surface and the carrier struts are manufactured as one piece of a wire. It is possible to configure the part surfaces of the standing surface as decorative platelets punched from a metal sheet. The use of decorative platelets of metal sheet allows the decorative platelets to partly overlap one another in the position in which the smallest standing surface is formed, while in a position in which the largest standing surface is formed such an overlapping is lesser or even is no longer present.

BRIEF DESCRIPTION OF THE DRAWINGS

The drawings show preferred embodiments of this invention, wherein.

DETAILED DESCRIPTION OF PREFERRED EMBODIMENTS

Figure 1:
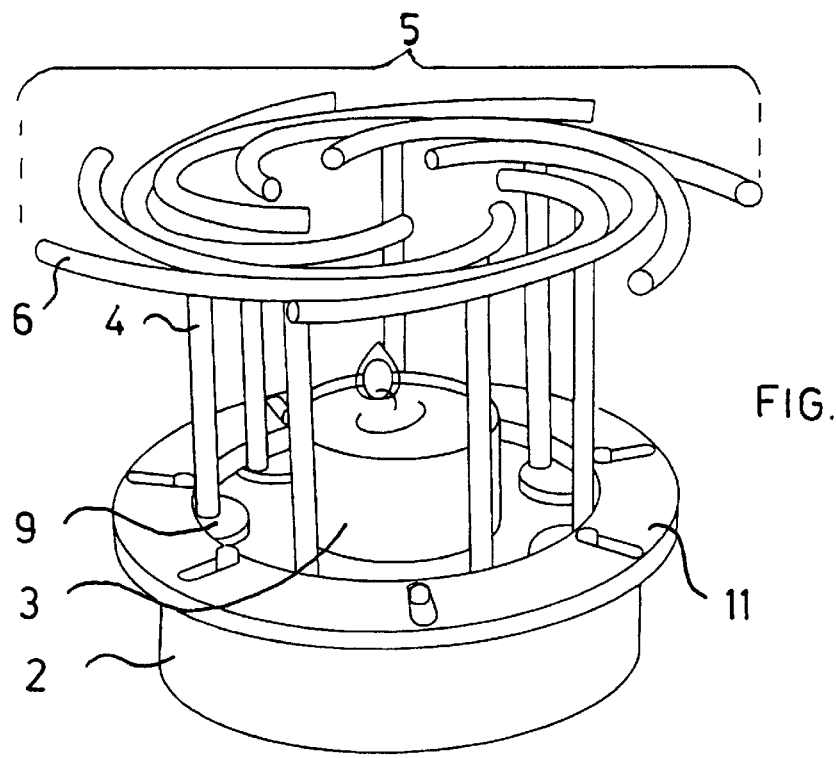
FIG. 1 is a perspective view of a warming device, according to this invention, in a position with a minimum standing surface.
Figure 2:
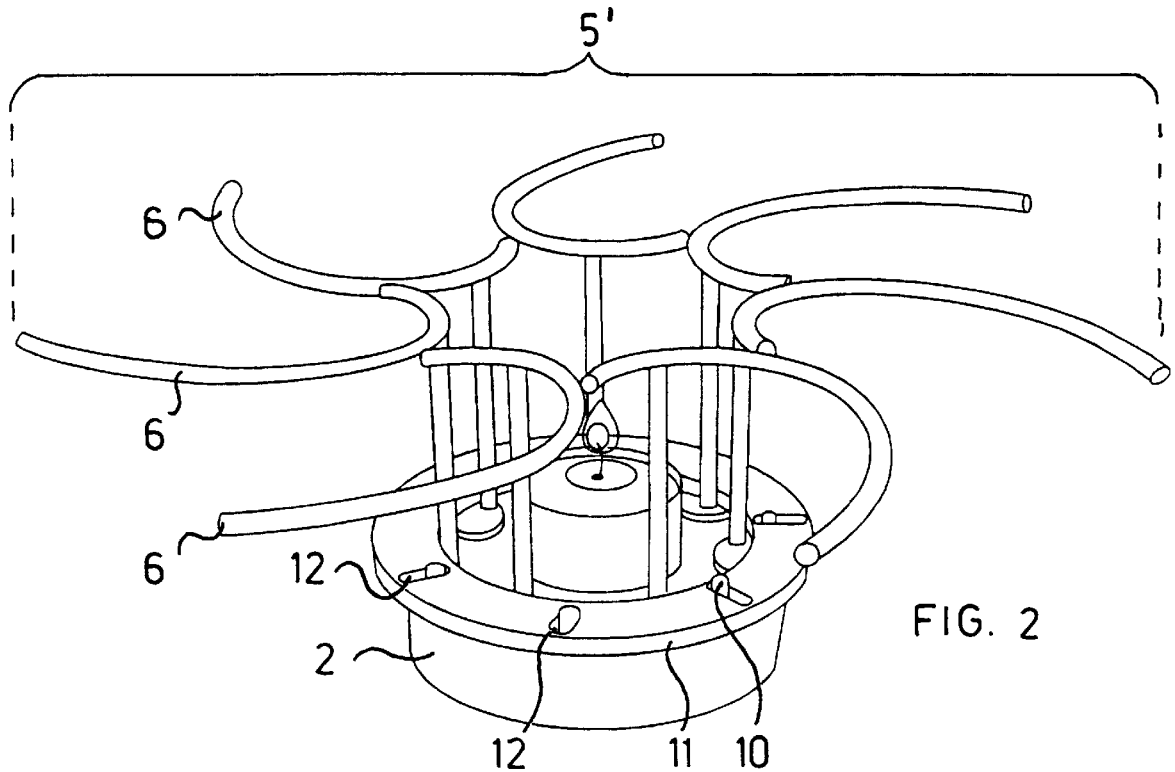
FIG. 2 is a perspective view of a warming device in a position with a maximum standing surface.

FIGS. 1 and 2 show the same warming plate or warming device in the two extreme positions with respect to a size of the standing surface. Throughout this specification and in the claims the standing surface is referred to and is to be understood as an overall surface formed by partial surfaces, for example a convex enveloping curve around the partial surfaces.

The complete warming device is indicated by element reference numeral 1. The warming device 1 has a base plate 2 which forms a rest surface, for example that contacts a table. In the embodiment shown, the base plate 2 has a considerable thickness, for example 1–2 cm. Such base plate 2 has one advantage of producing a large standing surface and it is possible for the base plate 2 to have suitable bores which serve as bearings for the carrier struts 4. The base plate 2 at the same time forms a standing surface for a heat source 3.

In the example shown, the heat source 3 is a warming plate candle. Conventional gas burners or spirit burners may be used with the warming plate according to this invention. Between the carrier struts 4 there remains sufficient space to guide or accommodate an actuation lever of the burner. Because the carrier struts 4 have translatory movement there is no interference with the actuation lever. The carrier struts 4 are configured as vertical upwardly directed wire rods and are connected at upper ends to wire sections which define part surfaces 6. The part surfaces 6 together form the standing surface 5. The minimum standing surface 5 is shown in FIG. 1 while the maximum standing surface 5' is shown in FIG. 2. The configuration shape of the part surfaces 6 may be of any suitable type, however they must be formed such that the required pivoting movement may take place without the part surfaces 6 interfering with each other. The part surfaces 6 can be manufactured not only as wire rods but also as flat platelets. Such platelets punched from metal sheet may also be suitably configured as decorative platelets. With a slight inclination of the part surface 6 with respect to the carrier strut 4, it is also possible for the decorative platelets of metal sheet to overlap one another in the position in which they form the minimum standing surface 5. In the outwardly deflected position in which they define the maximum standing surface 5' the inclined decorative platelets could no longer overlap or only slightly overlap each other.

Figure 5:
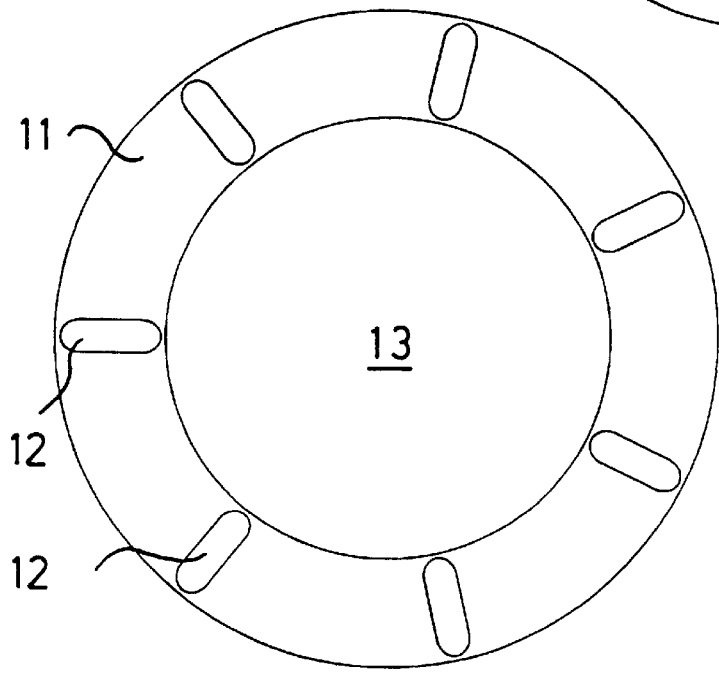
FIG. 5 is a top view of an actuation element.

The actuation element 11 can be an element with a striking configuration. FIG. 5 shows the actuation element 11 as an annular disk. The annular disk comprises radially outwardly directed guide slots 12. A central opening 13 of the actuation element 11 is likewise circular with a diameter selected such that all of the bearing bores 7 arranged on the base plate 2, in the assembled condition of the warming plate, lie within the circular opening. Because in the bearing bores 7 as already described the carrier struts 4 are pivotally mounted, the actuation element 11 or the annular disk encompasses the carrier struts 4.

Figure 3:
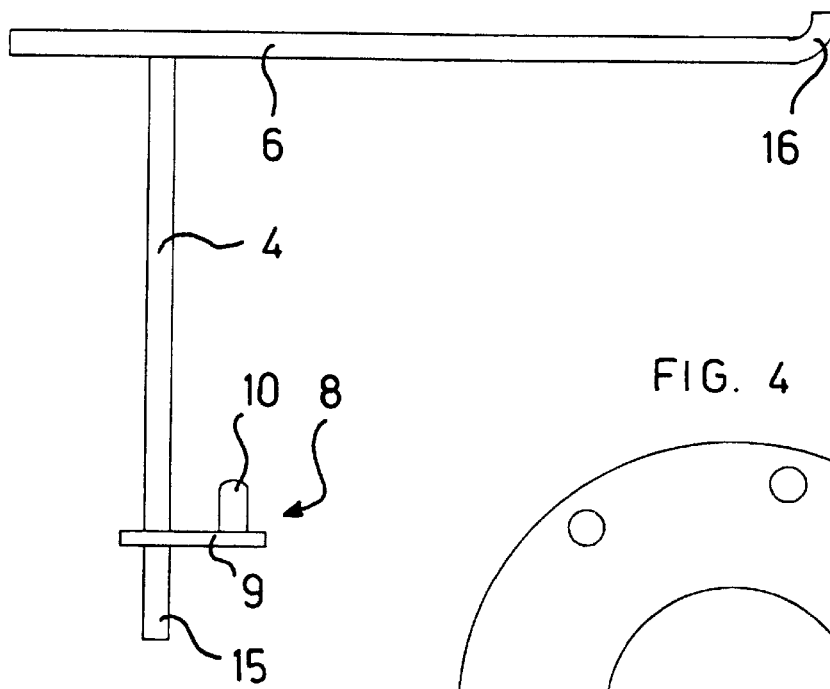
FIG. 3 is a side view of a pivotally movable strut with the parts arranged rigidly thereon.
Figure 4:
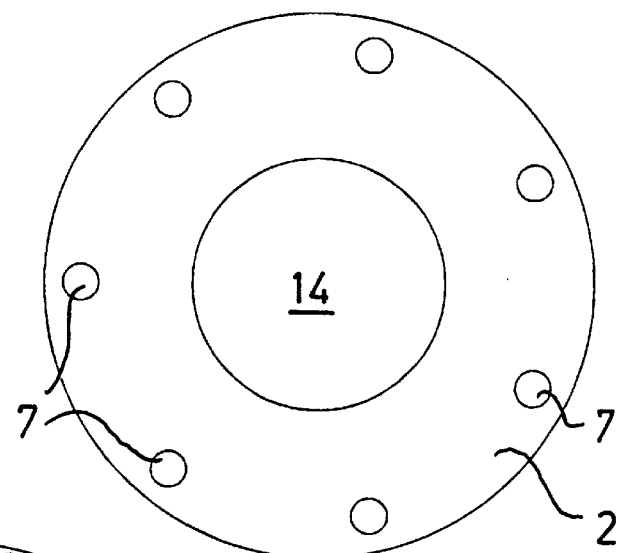
FIG. 4 is a top view of a base plate of a warming device according to this invention.

On the carrier strut 4, perpendicular to its longitudinal axis, there are formed platelets 9. The circular platelets 9, eccentric with respect to the carrier struts 4, are preferably welded on and carry additional lug pins 10. In one embodiment the lug pins 10 are parallel to the carrier struts 4 and are directed upwards towards the part surface 6. This is shown in FIG. 3. The platelet 9 and the lug pin 10 together form the lug 8. In the assembled condition, a lowermost end 15 of the carrier strut 4 is mounted in the bearing bore 7 of the base plate 2. Advantageously, the bearing bores 7 can be designed as a pocket hole bore so that the lower end 15 of the carrier strut 4 stands up in the pocket hole bore of the bearing bore 7. Then the mentioned platelet 9 of the lug 8 does not lie on the base plate 2, but moves at a distance slightly above the base plate 2. The actuation element 11, in the shape of an annular disk, then lies on the mentioned platelet 9 of the lug 8. Simultaneously, the lug pins 10 pass through corresponding radial slots 12 of the annular disk or the actuation element 11. The radial slots 12 permit a relative movement of the lug pins 10 in the radial slots 12. With a rotational movement of the actuation element 11 about a maximum possible angle in order to change the variable standing surface 5 from the minimum size to the maximum size, the lug pins 10 travel from the innermost position as shown in FIG. 1, in the radial slots 12, first outwards and then inwards. The warming plate 1 in each intermediate position may be used just as in the two end positions.

With the enlarged standing surface 5 and 5' the specific pressure of the receptacle standing thereon is reduced and the receptacle is displaceable on the standing surface 5 and 5'. In one preferred embodiment, it is useful on the part surfaces 6 to provide suitable anti-slip means. The anti-slip means may comprise the peripheral ends of the part surfaces 6 of the standing surface having an upwardly projecting region 16. This may formed by material thickenings or bulges.

In another preferred embodiment, there is a rotatably movable arrangement of the part surfaces 6 on the carrier struts 4. Such a solution spares an actuation ring but is not as stable.

Without departing from the concept of this invention there are present various possibilities in particular with respect to the modeling. Apart from the various aesthetic model forms of the part surfaces 6, the base plate 2 as well as the actuation element 11 may be varied in shape. Also with respect to the choice of materials, there are practically no limits. Almost all metal combinations may be suitable.

I claim:

1. In a warming device (1) having a base plate (2) onto which a heat source (3) can be placed, a plurality of carrier struts (4) forming a standing surface (5), the improvement comprising: the base plate (2) having a plurality of circumferentially arranged bearing bores (7), the carrier struts (4) rotatably mounted in the bearing bores (7), the standing surface (5) formed by a plurality of wire sections (6) each connected to a corresponding carrier strut (4) of the carrier struts (4), and pivoting the wire sections (6) varies a diameter of the standing surface (5), a plurality of lugs (8), each of the lugs (8) having a platelet (9) fixed to the corresponding carrier strut (4) and a lug pin (10) attached to the platelet (9), an actuation element (11) having a plurality of radial guide slots (12), and the lug pin (10) engaged within one of the radial guide slots (12).

2. In a warming device according to claim 1, wherein the lugs (8) allow pivoting movement of the carrier struts (4).

3. In a warming device according to claim 1, wherein the pivotal carrier struts (4) pivot about an axis with respect to the actuation element (11).

4. In a warming device according to claim 1, wherein the lug pin (10) is positioned at a distance from the corresponding carrier strut (4).

5. In a warming device according to claim 1, wherein the actuation element (11) is an annular disk.

6. In a warming device according to claim 5, wherein the carrier struts (4) are arranged within a central opening (13) of the annular disk (11).

7. In a warming device according to claim 1, wherein the platelet (9) is rigidly fixed onto the corresponding carrier strut (4), and the platelet (9) is parallel to the base plate (2) on which the annular disk (11) is positioned.

8. In a warming device according to claim 1, wherein the base plate (2) comprises a central recess (14) for accommodating the heat source (3).

9. In a warming device according to claim 1, wherein the wire sections (6) of the standing surface (5) are formed of a wire.

10. In a warming device according to claim 1, wherein the wire sections (6) of the standing surface (5) are formed with the carrier struts (4) as one piece of wire.

11. In a warming device according to claim 1, wherein the wire sections (6) of the standing surface (5) are decorative plates punched from a metal sheet.

12. In a warming device according to claim 1, wherein peripheral ends of the wire sections (6) comprise a region (16) projecting upwards from the standing surface (5).

13. In a warming device according to claim 1, wherein the carrier struts (4) are arranged within a central opening (13) of the actuation element (11).

\* \* \* \* \*